Oct. 9, 1934.  A. P. BRUSH  1,976,432
FLUID POWER TRANSMISSION
Original Filed Dec. 15, 1924
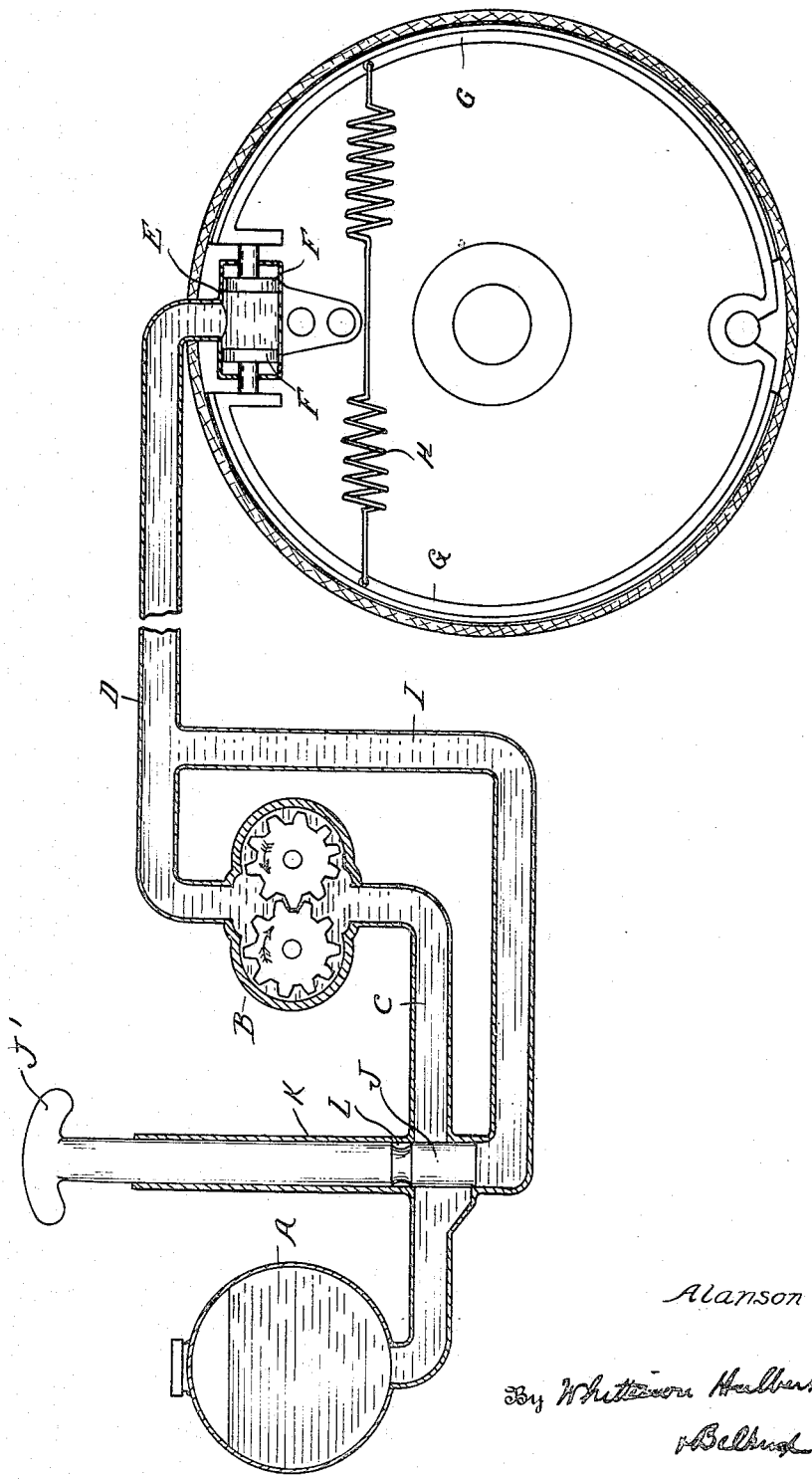
Inventor
Alanson P. Brush
By Whittemore Hulbert Whittemore
Belknap   Attorneys

UNITED STATES PATENT OFFICE 1,976,432

FLUID POWER TRANSMISSION

Alanson P. Brush, Detroit, Mich., assignor to Bragg-Kliesrath Corporation

Application December 15, 1924, Serial No. 756,108
Renewed January 23, 1932

8 Claims. (Cl. 60—52)

The invention relates to fluid power transmission devices more particularly designed for use in connection with hydraulic brakes, but also applicable to other purposes. It is the primary object of the invention to provide means for utilizing the power of a driven member for effecting any desired displacement of the fluid and the development of any desired pressure thereon, together with means for automatically arresting further displacement of the fluid when such pressure is attained. It is a further object to maintain the pressure once developed as long as desired and without regard to whether the driven member continues its movement or is stationary. Still further, it is an object to permit, when so desired, the release of pressure and the return of the fluid to a storage container. With these objects in view the invention consists in the construction as hereinafter set forth.

In the drawing the device is represented diagrammatically as a hydraulic brake mechanism.

A is a storage tank for the fluid, B is a pump or impeller for the fluid, which as shown is in the form of a well known gear pump having an inlet conduit C supplied from the tank A and a discharge conduit D. E is a cylinder and F pistons therein for actuating the shoes G of a brake mechanism, said shoes being normally retracted by a spring H. I is a return conduit or by-pass between the outlet conduit D and the tank A, and J is a valve for controlling both the conduits C and I.

The valve J as shown is in the form of a plunger slidable in a casing K to either completely cut off connection between the conduit C and the tank A or to variably restrict communication therebetween. It also serves to close or open communication between the conduit I and the tank A, being so arranged that the pressure developed in the conduit D transmitted through the conduit I will tend to move the valve into position for completely closing the conduit C. As shown, this plunger is operated by a pedal J'.

With the construction as described, the operation is as follows: The pump B is driven either constantly from the motor of the vehicle or indirectly and intermittently through the mechanism operating only when the vehicle is in motion. The normal position of the valve J is as shown in the drawing, where communication between the tank A and the inlet conduit C is completely cut off, thereby preventing any displacement of fluid by the pump. When, however, the plunger J is depressed, the port L therein will be brought into registration with the conduit C, permitting the movement of fluid through said conduit and the propulsion of the same by the pump B into the conduit D. This will produce the necessary displacement and develop the required pressure for actuating the pistons F in the cylinder E and applying the brakes. At the same time the pressure developed in the conduit D is transmitted through the conduit I to the end of the plunger J, forcing it upward against the operating pressure manually developed by the pedal J' until the port L is again out of registration with the conduit C and further movement of the fluid is prevented. This in turn will arrest further movement of the valve so long as the operating force is maintained on the plunger by means of a pedal J, in which position both conduits C and I are cut off from the tank A and the pressure in the conduits D and I will be maintained. It is obvious that pressure once developed by the pump B will continue within the conduits D and cylinder E as long as the pedal remains stationary even though movement of the pump itself is discontinued, as would be the case if it were driven from a portion of the vehicle moving only when the vehicle is in motion. Thus if the brakes are applied to stop the vehicle, the braking pressure will be continued to hold the vehicle stationary after its movement is arrested.

To release the brake pressure on the pedal is relieved and the plunger J is permitted to move in the opposite direction sufficiently to open communication between the conduit I and the tank A, whereupon the spring H will release the brake and through the pistons F will displace the fluid in the cylinder E, returning it to the storage tank A. The return of the plunger is effected by the fluid pressure within the conduit I due to the reaction of the spring H upon the piston F in the cylinder E.

While I have described the construction as applied to a single brake, it is obvious that it is equally applicable to a system of brakes and without regard to either the displacement or the pressure required for actuating the same.

What I claim as my invention is:

1. A brake system for an automotive vehicle comprising, in combination with brake mechanism to be operated, a fluid operated motor operably connected to said brake mechanism, a fluid pump, a pressure fluid reservoir, fluid transmitting connections interconnecting said motor, pump and reservoir, a manually operable valve member interposed in said connections between said pump and reservoir for controlling the operation of said pump to thereby control the application of the brakes by power, said connections including means interconnecting a portion of said connections between said pump and fluid operated motor with said valve whereby the latter is acted upon by the pressure fluid, during the application of the brakes by power, to isolate said reservoir from the rest of the fluid system to thereby maintain a given power loading of the brakes.

2. A brake system for an automotive vehicle comprising, in combination with brake mechanism to be operated, a hydraulic motor operably connected to said brake mechanism, a pump for impelling a force transmitting liquid to energize said hydraulic motor, a liquid reservoir, fluid transmitting connections interconnecting said motor, pump and reservoir, manually operable valve means, interposed in said connections between said pump and said reservoir, for controlling the operation of said pump, said connections including a discharge connection interconnecting said pump and brake mechanism, an inlet connection interconnecting said reservoir, and pump, and a by-pass connection interconnecting said discharge connection and inlet connection, said valve comprising a part operable in a lapped position to isolate said reservoir entirely from all the remainder of the fluid system by cutting off the connection between the reservoir and the pump and also cutting off the connection between the by-pass connection and inlet connection.

3. A brake system for an automotive vehicle comprising, in combination with brake mechanism to be operated, a motor operably connected to said brake mechanism, a prime mover pump, a source of power fluid, power fluid transmitting connections interconnecting said source of power fluid, pump and motor, and a manually operable control valve interposed in said connections between said pump and source of power fluid, said connections comprising means interconnecting the connection between said pump and motor, and said valve, whereby the power fluid reacts upon said valve to apprise the operator of the degree of power operation of the brake mechanism.

4. A brake system for an automotive vehicle comprising, in combination with brake mechanism to be operated, a motor operably connected to said brake mechanism, a pump, a source of power fluid, power fluid transmitting connections interconnecting said source of power fluid, pump and motor, and a manually operable control valve interposed in said connections between said pump and source of power fluid, said connections comprising fluid transmitting means interconnecting the pressure side of the pump with the valve, the power fluid within said connection constituting a link forming a positive connection between the brake mechanism and valve whereby with operation of said pump to apply the brake mechanism said power fluid reacts upon said valve in proportion to the application of the brakes by power to thus apprise the operator of the degree of power operation of the brake mechanism.

5. A brake system for an automotive vehicle comprising, in combination with brake mechanism to be operated, a fluid operated motor operably connected to said brake mechanism, a fluid pump, a fluid reservoir, a fluid transmitting connection interconnecting said pump and motor, a fluid transmitting connection interconecting said pump and reservoir, a control valve interposed in said last-mentioned connection, a by-pass fluid transmitting connection interconnecting said aforementioned connections, said valve comprising a portion selectively movable to cut in or cut out the operation of said pump to apply the brake mechanism and acted on by the power fluid within said by-pass to apprise the operator of the degree of power operation of the brake mechanism and to either cut off communication between said pump and reservoir and between said reservoir and by-pass or cut off communication between said reservoir and pump and interconnect said by-pass and reservoir.

6. A brake system for an automotive vehicle comprising, in combination, a fluid pump, a wheel brake, a fluid motor associated with said wheel brake and operated by the displacement of fluid by said pump, a supply connection from a source of fluid supply to said pump, controlling means for variably restricting said supply connection, manual means for operating said controlling means and means actuated by the pressure developed in the fluid by said pump for operating said controlling means in a direction opposite to the direction of operation of said manual means to cut off said supply.

7. In a brake system for an automotive vehicle, the combination with a fluid pump, of wheel brakes, a fluid motor associated with said wheel brakes and operated by the fluid displaced by said pump, a fluid supply reservoir, a supply conduit between said reservoir and said pump, a by-pass conduit from the discharge end of said pump to said supply conduit, a valve controlling both said supply conduit connecting said supply reservoir with said pump and said by-pass conduit connecting the motor to the reservoir, and manual means for actuating said valve in one direction to admit fluid from said reservoir to said supply conduit, said valve being arranged to be actuated by the fluid in said by-pass conduit to cut off the fluid supply to said pump.

8. A brake system for an automotive vehicle comprising in combination a reservoir for a liquid supply; a hydraulic pump; a brake; a brake motor; a plurality of connections between said reservoir, the inlet of said pump, the outlet of said pump, and the brake motor; means comprising a valve for selectively connecting the reservoir with the inlet of said pump or with the outlet of said pump and the brake motor and for selectively cutting off the connection from the reservoir both to said inlet of the pump and said outlet of the pump and the brake motor, or to the outlet of the pump and the brake motor only or to the inlet of the pump only.

ALANSON P. BRUSH.